(12) United States Patent
Puneeth

(10) Patent No.: US 12,322,224 B2
(45) Date of Patent: Jun. 3, 2025

(54) SYSTEM, DEVICE AND METHOD FOR TESTING AUTONOMOUS VEHICLES

(71) Applicant: Siemens Industry Software NV, Leuven (BE)

(72) Inventor: Nekkundi Somashekar Puneeth, Eindhoven (NL)

(73) Assignee: SIEMENS INDUSTRY SOFTWARE NV, Leuven (BE)

(*) Notice: Subject to any disclaimer, the term of this patent is extended or adjusted under 35 U.S.C. 154(b) by 0 days.

(21) Appl. No.: 17/766,220

(22) PCT Filed: Sep. 24, 2020

(86) PCT No.: PCT/EP2020/076665
§ 371 (c)(1),
(2) Date: Apr. 1, 2022

(87) PCT Pub. No.: WO2021/063786
PCT Pub. Date: Apr. 8, 2021

(65) Prior Publication Data
US 2024/0378926 A1    Nov. 14, 2024

(30) Foreign Application Priority Data
Oct. 2, 2019   (EP) .................................... 19201030

(51) Int. Cl.
G07C 5/08      (2006.01)
(52) U.S. Cl.
CPC ................................. G07C 5/0808 (2013.01)
(58) Field of Classification Search
CPC .................................................. G07C 5/0808
See application file for complete search history.

(56) References Cited

U.S. PATENT DOCUMENTS 10,304,455 B1    5/2019   Ulaganathan
10,431,023 B1*  10/2019  Watson ................ G05D 1/0088
(Continued)

FOREIGN PATENT DOCUMENTS

CN    107024356 A    8/2017
CN    107257765 A   10/2017
(Continued)

OTHER PUBLICATIONS

PCT International Search Report and Written Opinion of International Searching Authority mailed Jan. 27, 2021 corresponding to PCT International Application No. PCT/EP2020/076665.
(Continued)

*Primary Examiner* — Joseph J Dallo
(74) *Attorney, Agent, or Firm* — LEMPIA SUMMERFIELD KATZ LLC

(57) ABSTRACT

A system, device, and method for testing autonomous vehicles are disclosed. A device for testing a plurality of components of at least one autonomous vehicle includes a communication module including a set of interfaces communicatively couplable to the plurality of components of the at least one autonomous vehicle. The device also includes a processing unit communicatively coupled to the communication module and capable of mapping simulation instances to the set of interfaces of the communication module. The simulation instances include simulated sensor data and/or vehicle dynamics data reflecting behavior of the at least one autonomous vehicle.

13 Claims, 5 Drawing Sheets

(56) References Cited

U.S. PATENT DOCUMENTS

| | | |
|---|---|---|
| 2011/0288841 A1 | 11/2011 | Larsson et al. |
| 2016/0246304 A1 | 8/2016 | Canoy |
| 2018/0059678 A1 | 3/2018 | Bakhishev |
| 2019/0129831 A1 | 5/2019 | Goldberg |
| 2019/0163181 A1* | 5/2019 | Liu ................... G05D 1/0212 |
| 2019/0278290 A1 | 9/2019 | Zhang et al. |
| 2020/0001888 A1 | 1/2020 | Pretsch et al. |
| 2020/0027292 A1* | 1/2020 | Watson ............... G01M 17/007 |

FOREIGN PATENT DOCUMENTS

| | | | |
|---|---|---|---|
| CN | 108738356 A | 11/2018 | |
| DE | 102017129370 A1 | 7/2018 | |
| WO | WO-2022241149 A1 * | 11/2022 | ............. G06T 15/06 |

OTHER PUBLICATIONS

PCT International Preliminary Examination Report and Written Opinion of International Examination Authority mailed Dec. 22, 2021 corresponding to PCT International Application No. PCT/EP2020/076665.

* cited by examiner

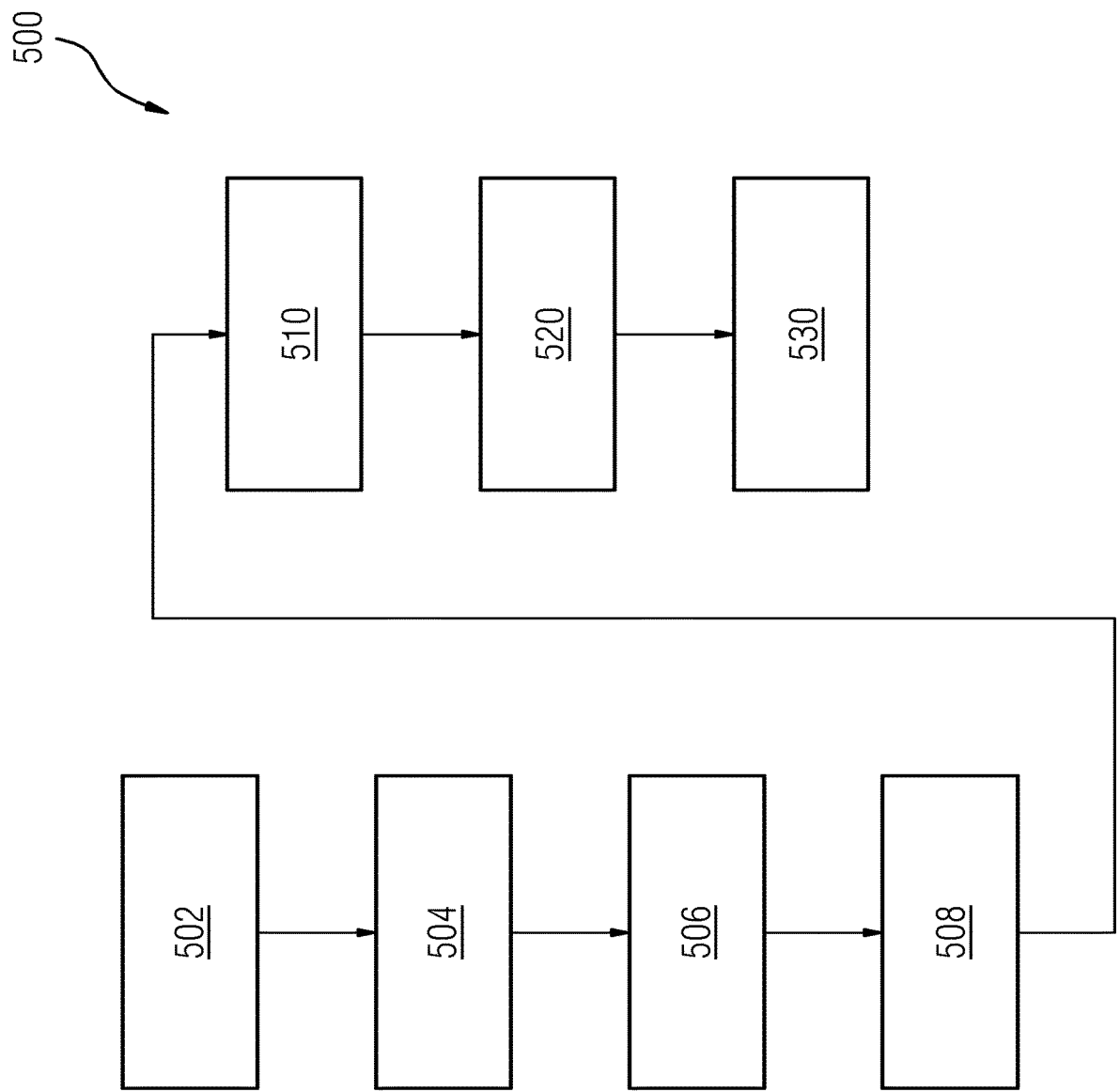

SYSTEM, DEVICE AND METHOD FOR TESTING AUTONOMOUS VEHICLES

This application is the National Stage of International Application No. PCT/EP2020/076665, filed Sep. 24, 2020, which claims the benefit of European Patent Application No. EP 19201030.4, filed Oct. 2, 2019. The entire contents of these documents are hereby incorporated herein by reference.

FIELD

The present embodiments relate to autonomous vehicles capable of land, water, and aerial movement and, more specifically, relate to testing operation of the autonomous vehicles.

BACKGROUND

Autonomous vehicles include multiple sensing and actuating units that are used to control the operation of the autonomous vehicle. The autonomous vehicles also include control units that interface with the sensing and actuating units to control and supervise the operation of the autonomous vehicle. The control units are used to provide safety of the autonomous vehicles and environment around the autonomous vehicles. Accordingly, the control units include multiple software modules that interact with each other to perform actions associated with perception, control, actuation, and safety.

To provide smooth operation of the control units, testing may be necessary. However, testing the control units may be time consuming. Further, the complexity of the testing may increase when operation of the sensing units, and actuating units may need to be validated.

One approach may include usage of simulation to test the control units, the sensing units, and the actuating units. In view of the safety requirements associated with operation of the autonomous vehicles, multiple simulations may be required to test the operation of the autonomous vehicle. Accordingly, running multiple simulations on the control units may also be time consuming.

SUMMARY AND DESCRIPTION

Testing of autonomous vehicles may be made effective by running simulation associated with multiple instances in real time on multiple autonomous vehicles or components thereof. Accordingly, a first aspect of the present embodiments discloses a device for testing a plurality of components of one or more autonomous vehicles. The device includes a communication module including a set of interfaces (e.g., simultaneously) communicatively couplable to the plurality of components of the at least one autonomous vehicle. The device also includes a processing unit communicatively coupled to the communication module and capable of mapping simulation instances to the interfaces of the communication module. The simulation instances include simulated sensor data reflecting behavior of the at least one autonomous vehicle.

As used herein, autonomous vehicles are vehicles that may sense an environment and navigate autonomously. The autonomous vehicles include multiple components for sensing and navigation. The components include sensing units, actuating units, and control units. Based on the type of the autonomous vehicle, the component nomenclature may vary. For example, in case of an autonomous aerial vehicle, the components include sensory payload, digital electronic speed controllers, and flight controller configured with flight stack control software. The autonomous vehicles may further include a programmable network interface to enable communication between the sensing units, the actuating units, and the control units. It will be appreciated by a person skilled in the art that other components may be included in the autonomous vehicles.

As used herein, processing unit refers to a circuitry that is configured to execute one or more logical functions. The processing unit may include multiple configurable logic blocks configured to perform the logical functions. Alternatively, the processing unit may include a dedicated circuity for the logical function.

As used herein, simulation instances refer to simulated sensor data and vehicle dynamics data for a behavior instance of the autonomous vehicle. The behavior instance refers to a scenario and the behavior or response of the autonomous vehicle at a given time instant for the scenario. The behavior instance may be based on changes in the environment or in the autonomous vehicle itself. For example, the behavior instance is reduced reflective properties for physics-based radar. In case of autonomous vehicles, the behavior instances may range from 1 million to 10 million. The simulation instance will include sensor data of the radar that indicate the reduced reflective capability. Further, the simulation instance includes how the actuating units in the autonomous vehicle will behave when the radar has reduced reflective capability. In another example, the behavior instance is the change in traffic conditions of the environment.

The simulation instances may be generated from a virtual model of the autonomous vehicle. The virtual model is a physics-based model of the environment and the autonomous vehicle including the sensing units, the actuating units, and the control units. The virtual model may include multiple behavior instances of the autonomous vehicle.

In an embodiment, the control units are configured to interface with other components in the autonomous vehicles. In such an embodiment, testing the control units effectively results in testing of the sensing units and the actuating units. Accordingly, the "device under test" for the present embodiment may be inferred as the entire autonomous vehicle.

The communication module in the device may be coupled to multiple control units at the same time. In an embodiment, each interface in the communication module may be coupled to a control unit. Accordingly, the present device is capable of testing multiple control units simultaneously. In an embodiment, the number of control units couplable to the communication module is dependent on bandwidth of a network interconnect between a simulation platform and the device. The network interconnect is a high bandwidth network that is wired or wireless.

In an embodiment, the set of interfaces includes sensor interfaces and actuator interfaces that are couplable to sensing units and actuation units of the autonomous vehicle. The sensing units and the actuation units are configurable via the sensor interfaces and the actuator interfaces, based on the simulation instances. The simulation instances include sensor values and actuator values. This is referred to as the simulated sensor data. Further, the simulated sensor data may indicate accelerations, decelerations, chassis control parameters, propeller control parameters, wheel slip angles, and vehicle roll of the at least one autonomous vehicle. This capability makes it possible to accurately test the control units and the autonomous vehicle. For example, recording the friction coefficients and pothole locations of a road may be configured using the simulation instances.

The processing unit of the device receives the simulation instances from the simulation platform via the network interconnect. In an embodiment, multiple simulation instances are received simultaneously. The control units are capable of receiving the simulation instances when the processing units map the simulation instances to the interfaces of the communication module. The control units are mapped based on a unique identifier associated with each of the control units. The processing unit routes one or more simulation instances to the corresponding control unit based on the mapping. In furtherance to mapping, the processing unit is configured to transmit the simulated sensor data in the mapped simulation instance to corresponding sensor interface in the communication module. Accordingly, the sensing units are configured with the simulated sensor data.

The present embodiments are advantageous in testing multiple autonomous vehicles parallelly (e.g., because multiple tests may be needed to certify the safety of the autonomous vehicle).

According to a second aspect of the present embodiments, a system for testing a plurality of autonomous vehicles is disclosed. The system includes a simulation platform configured to generate virtual models of the autonomous vehicles and environment associated with the autonomous vehicles, where the virtual models include simulated sensor data that indicate accelerations, decelerations, chassis control parameters, propeller control parameters, wheel slip angles, and vehicle roll of the autonomous vehicles. Further, the system includes one or more devices, as described above. The devices are communicatively coupled to the simulation platform, configured to test the autonomous vehicles using the virtual models.

In an embodiment, the system also includes control units communicatively coupled to the devices. The control units are configured to control sensing units and actuating units of the autonomous vehicles. Simulation instances generated from the virtual models are mapped to the control units using the at least one device.

According to a third aspect of the present embodiments, a method for testing a plurality of components of one or more autonomous vehicles is disclosed. The method includes receiving a plurality of simulation instances associated with behavior of the autonomous vehicle, where the simulation instances include simulated sensor data reflecting behavior of the at least one autonomous vehicle. The method also includes mapping the simulation instances to the plurality of components, and testing the plurality of components based on the execution of the simulation instances.

In an embodiment, the mapping of the simulation instances may include mapping the simulation instances to the autonomous vehicles, based on a unique identifier associated with the plurality of components, and routing at least one simulation instance to a corresponding component based on the mapping. Further, routing may include routing corresponding simulated sensor data to a corresponding sensor interface associated with the corresponding component of the autonomous vehicle. For example, routing of the simulation instance may include transmitting the at least one simulation instance on the appropriate sensor bus (e.g., CAN, Flexray, GMSL, etc.)

According to an embodiment, the method may further include generating virtual models of the autonomous vehicles and associated environment, where the virtual models include the simulated sensor data that indicate accelerations, decelerations, chassis control parameters, propeller control parameters, wheel slip angles, and vehicle roll of the at least one autonomous vehicle. Further, the method may include generating the simulation instances using the virtual models based on at least one of software updates, hardware updates, and predicted faults in the at least one autonomous vehicle.

According to another embodiment of the present embodiments, the method may include receiving simulation results from the plurality of components for the simulation instances. The method may further include validating operation of the plurality of components based on comparison of the simulation results to expected results.

According to a fourth aspect of the present embodiments, a computer readable medium is disclosed. The computer readable medium has machine-readable instructions stored therein, which when executed by a processing unit, cause the processing unit to perform a method as described hereinabove.

BRIEF DESCRIPTION OF THE DRAWINGS

FIG. 5 illustrates a method of testing a plurality of components of at least one autonomous vehicle, according to an embodiment.

DETAILED DESCRIPTION

Figure 1:
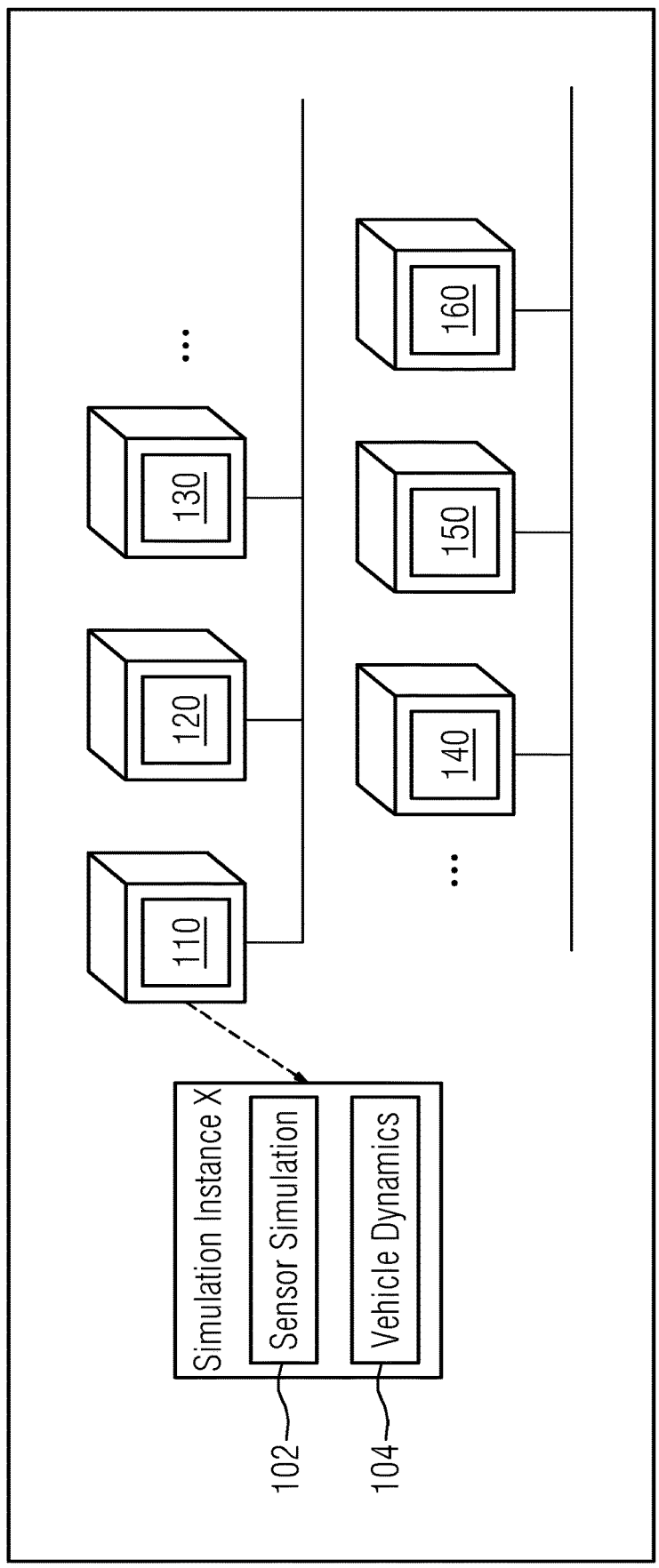
FIG. 1 illustrates simulation instances used to test autonomous vehicles, according to an embodiment.

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates simulation instances 110, 120, 130, 140, 150, and 160 (collectively referred to using the numeral 100) used to test autonomous vehicles, according to an embodiment. Each simulation instance 110-160 may be associated with one or more autonomous vehicles.

As shown in FIG. 1, the simulation instances 110-160 include simulated sensor data 102 and vehicle dynamics data 104. The simulated sensor data 102 includes sensor values that indicate accelerations, decelerations, wheel slip angles, and vehicle roll of the autonomous vehicle. Further, the simulated sensor data 102 includes simulations of Lidar, Camera, and Radar sensor data. The vehicle dynamics data 104 indicate the state of the actuator units in the autonomous vehicle (e.g., chassis control parameters, propeller control parameters). It will be appreciated by a person skilled in the art that the simulation instances 110-160 may include either one of the simulated sensor data 102 or vehicle dynamics data 104, or both.

Each simulation instance 110-160 may include differing values for the simulated sensor data 102 and the vehicle dynamics data 104. The simulation instances 110-160 depend on the scenario for which the autonomous vehicles are tested. For example, the scenario for simulation instance 110 is that there is an immovable obstruction in the path of the autonomous vehicle (e.g., a building in front of an aerial autonomous vehicle). A scenario for simulation instance 120 is that an object has potential for obstructing the autonomous vehicle (e.g., a tree that may fall on the road on which the autonomous vehicle passes). Other scenarios may include failure of the braking system of the autonomous vehicle.

Figure 2:
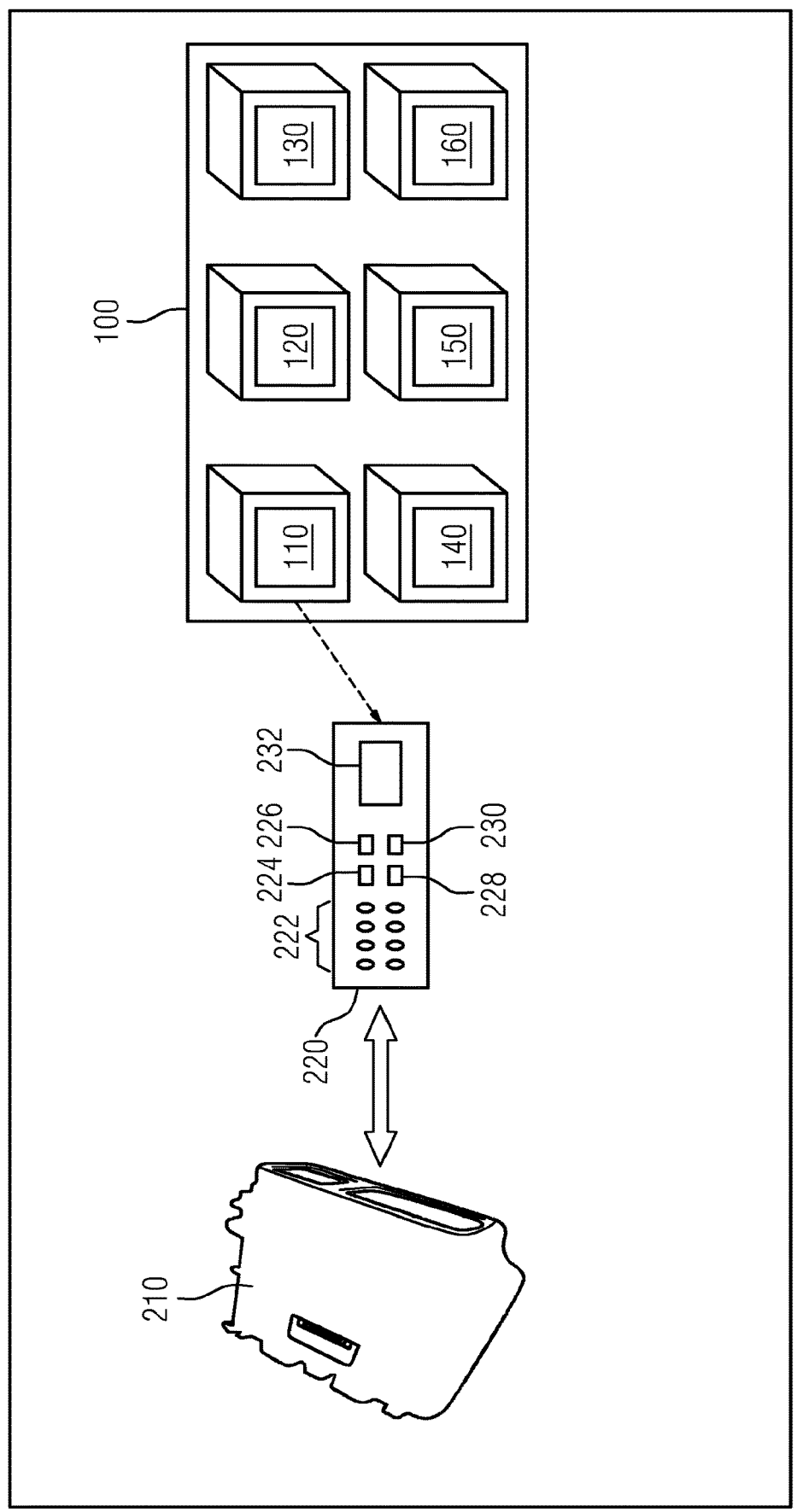
FIG. 2 illustrates an interface between a device under test the simulation instances, according to an embodiment.

FIG. 2 illustrates an interface 220 between a Device Under Test (DUT) 210 and the simulation instances 100, according to an embodiment. The simulation instances 100 are transmitted to one or more interfaces 220. In FIG. 2, the simulation instance 110 is communicated to the interface 220 via a network interconnect.

The DUT 210 is a computational hardware of an autonomous vehicle that includes a control unit and controls sensing units, and actuating units in the autonomous vehicle. Testing the computational hardware therefore results in testing of the autonomous vehicle.

The interface 220 communicates with the sensing units and the actuating units via sensing interfaces 222, 224, 226, 228, 230 and actuating interface 232. The sensing interfaces include a camera interface 222, a vehicle to environment/everything (V2X) interface 224, a Lidar interface 226, an ultrasonic sensor interface 228, and a radar interface 230. The actuating interface is a vehicle interface 232 that connects to the actuating units of the autonomous vehicle.

Figure 3:
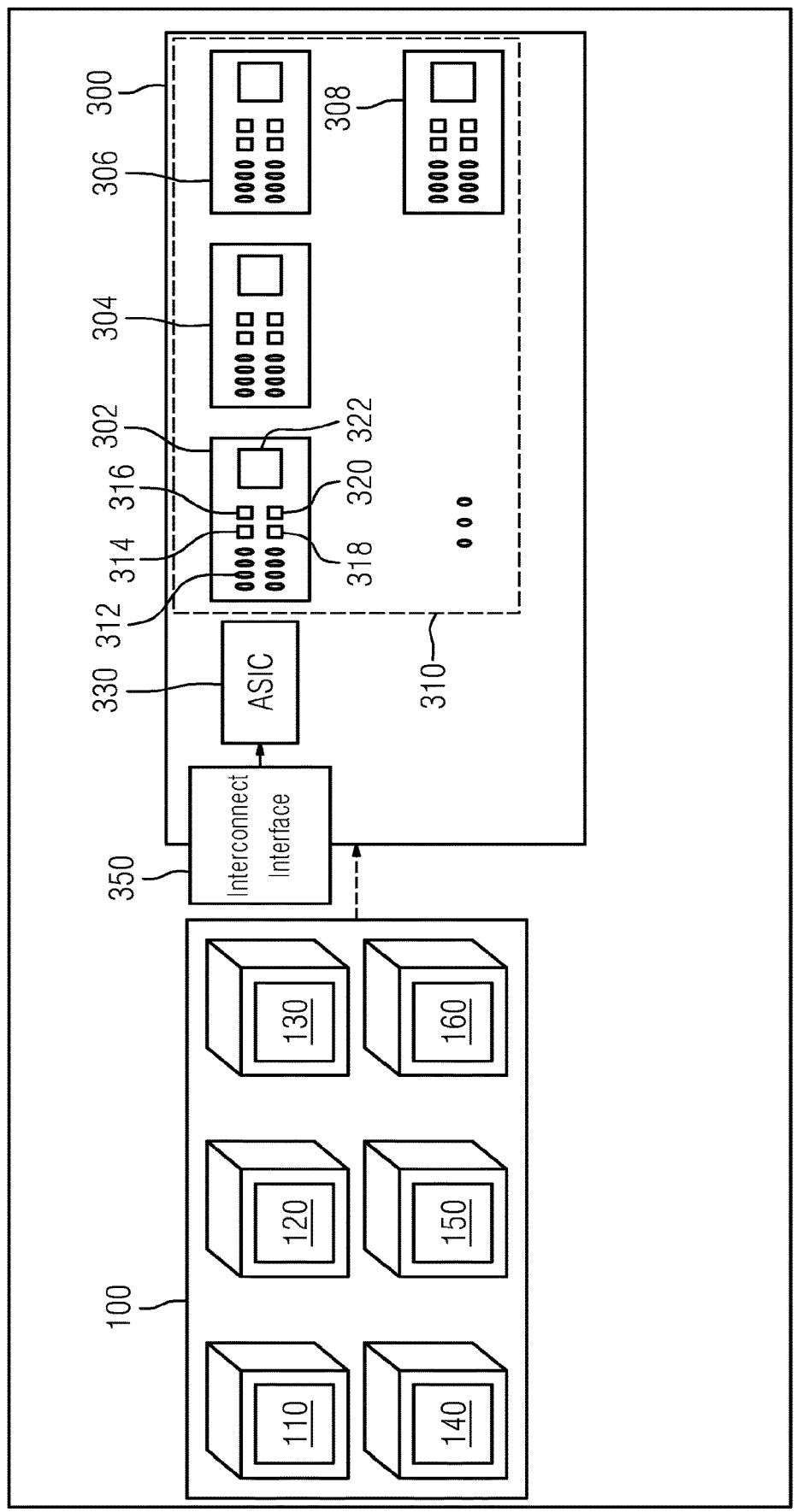
FIG. 3 illustrates a block diagram of a device for testing a plurality of components of at least one autonomous vehicle, according to an embodiment.

FIG. 3 illustrates a block diagram of a device 300 for testing a plurality of components (not shown) of at least one autonomous vehicle (not shown), according to an embodiment. The plurality of components may include sensing units, actuating units, and control units. The device 300 includes a communication module 310 including a set of interfaces 302, 304, 306, and 308.

The interfaces 302-308 include camera interface 312, V2X interface 314, lidar interface 316, ultrasonic sensor interface 318, radar interface 320 and vehicle interface 322. The interfaces 302-308 are communicatively couplable to the plurality of components of the autonomous vehicle. Accordingly, the sensing units and the actuation units are configurable via the sensor interfaces 312-320 and the actuator (e.g., vehicle) interface 322.

The device 300 further includes a processing unit 330 communicatively coupled to the communication module 310. In an embodiment, the processing unit 330 is an Application Specific Integrated Circuit. Further, the processing unit 330 receives the simulation instances 110-160 via a network interconnect 350. The processing unit 330 allows the simulation instances 110-160 to access an individual component of the plurality of components via the interfaces 308-310. The processing unit 330 pushes the simulated sensor data and the vehicle dynamics data into the sensor interfaces 312-320 and the actuator interface 322.

The processing unit 330 is capable of mapping simulation instances 110-160 to the interfaces 302-308 of the communication module 310. The simulation instances 110-160 are used to configure the sensing units and the actuating units via the interfaces 302-308. The processing unit 330 maps the simulation instances 110-160 based on a unique identifier associated with the autonomous vehicles. Further, the processing unit 330 transmits the simulated sensor data and the vehicle dynamics data in the mapped simulation instance to a corresponding sensor interface and actuator interface in the communication module 310.

Figure 4:
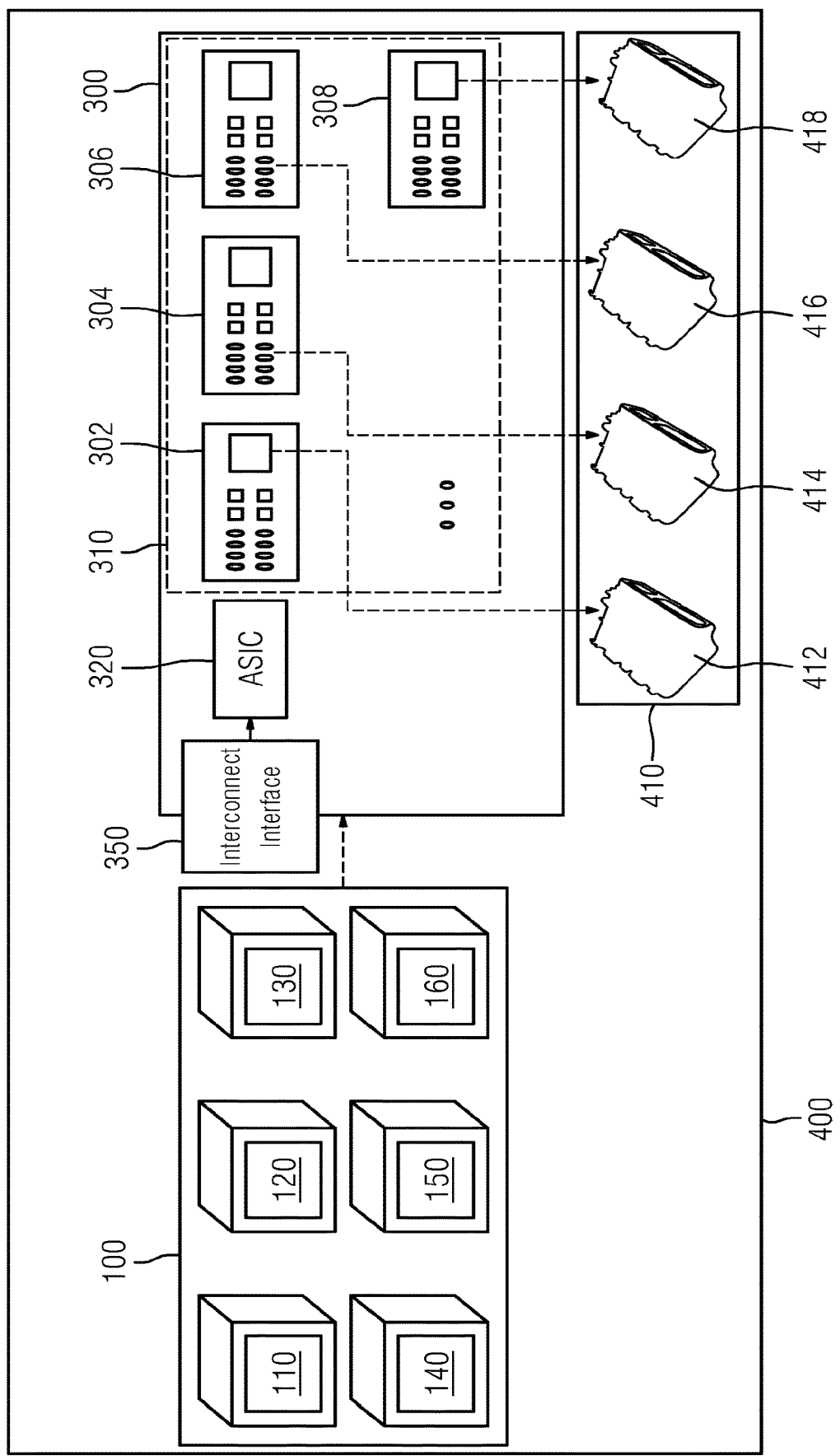
FIG. 4 illustrates a block diagram of a system for testing a plurality of autonomous vehicles, according to an embodiment.

FIG. 4 illustrates a block diagram of a system 400 for testing a plurality of autonomous vehicles according to an embodiment. In FIG. 4, the autonomous vehicles are represented by control units 412-418 that serve as the brain of the autonomous vehicle. Testing operation of the control units 412-418 results in the testing of operations of the autonomous vehicles. The control units 412-418 are referred cumulatively as Devices Under Test (DUTs) 410. The DUTs 410 may be individually connected to the interfaces 302-308, as shown in FIG. 4.

The system 400 further includes a simulation platform 420 configured to generate virtual models of the autonomous vehicles and environment associated with the autonomous vehicles. The virtual models include simulated sensor data and the vehicle dynamics data indicating accelerations, decelerations, chassis control parameters, propeller control parameters, wheel slip angles, and vehicle roll of the autonomous vehicles. The virtual models are used to generate the simulated instances 110-160.

FIG. 5 illustrates a method 500 of testing a plurality of components of at least one autonomous vehicle, according to an embodiment. The plurality of components include sensing units, actuator units, and control units of the autonomous vehicle. The method begins at act 502 by generating virtual models of the autonomous vehicles and associated environment, where the virtual models include the simulated sensor data and vehicle dynamics data that indicate accelerations, decelerations, chassis control parameters, propeller control parameters, wheel slip angles, and vehicle roll of the at least one autonomous vehicle. Further, at act 502, simulation instances are generating using the virtual models based on at least one of software updates, hardware updates, and predicted faults in the at least one autonomous vehicle.

At act 504, a plurality of simulation instances associated with behavior of the autonomous vehicle are received. At act 506, the simulation instances are mapped to the plurality of components based on a unique identifier associated with each of the components. Further, at act 508 at least one simulation instance is routed to a corresponding component based on the mapping. Therefore, corresponding simulated sensor data and vehicle dynamics data are routed to a corresponding sensor interface associated with the corresponding component of the at least one autonomous vehicle At act 510, the simulation instances are executed on the plurality of components. For example, at act 510, the sensing units of the autonomous vehicle are disconnected in a physical state while the sensor data is being generated in real time based on the simulation instances. In this way, complex tests with multiple traffic participants may be executed with the autonomous vehicle on a proving ground (e.g., getting exact results for braking distance or lane-keeping performances).

At act 520, simulation results from the plurality of components are received after the execution. At act 530, operation of the autonomous vehicle and the plurality of components are validated by comparing the simulation results to expected results.

The present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device); propagation mediums in and of themselves as signal carriers are not included in the definition of physical computer-readable medium, which may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and/or DVD. Both processors and program code for implementing each aspect of the technology may be centralized or distributed (or a combination thereof) as known to those skilled in the art.

While the present invention has been described in detail with reference to exemplary embodiments, the present invention is not limited to those embodiments. In view of the present disclosure, many modifications and variations would present themselves to those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device for testing a plurality of components of at least one autonomous vehicle, the device comprising:
 a communication module comprising a set of interfaces communicatively couplable to the plurality of components of the at least one autonomous vehicle; and
 a processing unit communicatively coupled to the communication module and operable to map simulation instances to the set of interfaces of the communication module, wherein the simulation instances include simulated sensor data and vehicle dynamics data reflecting behavior of the at least one autonomous vehicle,
 wherein the processing unit is configured to:
  map the simulation instances to the at least one autonomous vehicle based on a unique identifier associated with the plurality of components;
  route at least one of the simulation instances to a corresponding component of the plurality of components based on the map; and
  transmit the simulated sensor data and the vehicle dynamics data in the at least one mapped simulation instance to a corresponding sensor interface and a corresponding actuator interface in the communication module.

2. The device of claim 1, wherein the set of interfaces comprises sensor interfaces and actuator interfaces that are couplable to sensing units and actuation units of the at least one autonomous vehicle, the sensor interfaces including the corresponding sensor interface and the actuator interfaces including the corresponding actuator interface, and
 wherein the sensing units and the actuation units are configurable via the sensor interfaces and the actuator interfaces, based on the simulation instances.

3. The device of claim 1, wherein the simulated sensor data and the vehicle dynamics data are from virtual models of the at least one autonomous vehicle and associated environment, and
 wherein the simulated sensor data and the vehicle dynamics data indicate accelerations, decelerations, chassis control parameters, propeller control parameters, wheel slip angles, and vehicle roll associated with the at least one autonomous vehicle.

4. A system for testing a plurality of autonomous vehicles, the system comprising:
 a simulation platform configured to:
  generate virtual models of the autonomous vehicles and an environment associated with the autonomous vehicles, wherein the virtual models include simulated sensor data and vehicle dynamics data indicating accelerations, decelerations, chassis control parameters, propeller control parameters, wheel slip angles, and vehicle roll of the autonomous vehicles; and
 at least one device for testing a plurality of components of the plurality of autonomous vehicles, the at least one device being communicatively coupled to the simulation platform, and being configured to test the plurality of autonomous vehicles using the virtual models, a device of the at least one device comprising:
  a communication module comprising a set of interfaces communicatively couplable to the plurality of components of the plurality of autonomous vehicle; and
  a processing unit communicatively coupled to the communication module and operable to map simulation instances to the set of interfaces of the communication module, wherein the simulation instances include simulated sensor data and vehicle dynamics data reflecting behavior of the plurality of autonomous vehicles,
 wherein the processing unit is configured to:
  map the simulation instances to the plurality of autonomous vehicles based on a unique identifier associated with the plurality of components;
  route at least one of the simulation instances to a corresponding component of the plurality of components based on the map; and
  transmit the simulated sensor data and the vehicle dynamics data in the at least one mapped simulation instance to a corresponding sensor interface and a corresponding actuator interface in the communication module.

5. The system of claim 4, further comprising:
 control units communicatively coupled to the at least one device,
 wherein the control units are configured to control sensing units and actuating units of the plurality of autonomous vehicles, and
 wherein simulation instances generated from the virtual models are mapped to the control units using the at least one device.

6. A method of testing a plurality of components of at least one autonomous vehicle, the method comprising:
- receiving a plurality of simulation instances associated with behavior of the at least one autonomous vehicle, wherein the plurality of simulation instances include simulated sensor data and vehicle dynamics data reflecting behavior of the at least one autonomous vehicle;
- mapping the simulation instances to the plurality of components; and
- testing the plurality of components based on execution of the simulation instances,
- wherein mapping the simulation instances to the plurality of components comprises:
  - mapping the simulation instances to the at least one autonomous vehicle, based on a unique identifier associated with the plurality of components; and
  - routing at least one of the simulation instances to a corresponding component of the plurality of components based on the mapping of the simulation instances to the at least one autonomous vehicle, based on the unique identifier.

7. The method of claim 6, further comprising:
- generating virtual models of the at least one autonomous vehicle and an associated environment, wherein the virtual models include the simulated sensor data and the vehicle dynamics data that indicate accelerations, decelerations, chassis control parameters, propeller control parameters, wheel slip angles, and vehicle roll of the at least one autonomous vehicle; and
- generating the simulation instances using the virtual models based on software updates, hardware updates, predicted faults in the at least one autonomous vehicle, or any combination thereof.

8. The method of claim 6, wherein routing the at least one simulation instance to the corresponding component comprises:
- routing corresponding simulated sensor data and vehicle dynamics data to a corresponding sensor interface associated with the corresponding component of the at least one autonomous vehicle.

9. The method of claim 6, further comprising:
- receiving simulation results from the plurality of components for the simulation instances; and
- validating operation of the plurality of components based on comparison of the simulation results to expected results.

10. In a non-transitory computer-readable storage medium that stores instructions executable by a processing unit to test a plurality of components of at least one autonomous vehicle, the instructions comprising:
- receiving a plurality of simulation instances associated with behavior of the at least one autonomous vehicle, wherein the plurality of simulation instances include simulated sensor data and vehicle dynamics data reflecting behavior of the at least one autonomous vehicle;
- mapping the simulation instances to the plurality of components; and
- testing the plurality of components based on execution of the simulation instances,
- wherein mapping the simulation instances to the plurality of components comprises:
  - mapping the simulation instances to the at least one autonomous vehicle, based on a unique identifier associated with the plurality of components; and
  - routing at least one of the simulation instances to a corresponding component of the plurality of components based on the mapping of the simulation instances to the at least one autonomous vehicle, based on the unique identifier.

11. The non-transitory computer-readable storage medium of claim 10, wherein the instructions further comprise:
- generating virtual models of the at least one autonomous vehicle and an associated environment, wherein the virtual models include the simulated sensor data and the vehicle dynamics data that indicate accelerations, decelerations, chassis control parameters, propeller control parameters, wheel slip angles, and vehicle roll of the at least one autonomous vehicle; and
- generating the simulation instances using the virtual models based on software updates, hardware updates, predicted faults in the at least one autonomous vehicle, or any combination thereof.

12. The non-transitory computer-readable storage medium of claim 10, wherein routing the at least one simulation instance to the corresponding component comprises:
- routing corresponding simulated sensor data and vehicle dynamics data to a corresponding sensor interface associated with the corresponding component of the at least one autonomous vehicle.

13. The non-transitory computer-readable storage medium of claim 10, further comprising:
- receiving simulation results from the plurality of components for the simulation instances; and
- validating operation of the plurality of components based on comparison of the simulation results to expected results.

* * * * *